United States Patent
McNeely et al.

(10) Patent No.: US 7,130,877 B2
(45) Date of Patent: Oct. 31, 2006

(54) REQUEST PROCESSING SWITCH

(75) Inventors: Jason McNeely, Kanata (CA); Salman Jaffer Jan, Nepean (CA)

(73) Assignee: Alcatel Canada Inc., Kanata (CA)

( * ) Notice: Subject to any disclaimer, the term of this patent is extended or adjusted under 35 U.S.C. 154(b) by 688 days.

(21) Appl. No.: 10/259,398

(22) Filed: Sep. 30, 2002

(65) Prior Publication Data

US 2004/0064824 A1 Apr. 1, 2004

(51) Int. Cl.
 *G06F 15/16* (2006.01)
(52) U.S. Cl. .................. 709/201; 709/203; 709/238; 709/239; 719/315
(58) Field of Classification Search ................ 709/203, 709/230–232, 201, 238–239; 719/315
See application file for complete search history.

(56) References Cited

U.S. PATENT DOCUMENTS

| | | | | |
|---|---|---|---|---|
| 5,341,477 | A * | 8/1994 | Pitkin et al. ................. | 709/226 |
| 5,644,720 | A * | 7/1997 | Boll et al. ................... | 709/227 |
| 5,928,323 | A * | 7/1999 | Gosling et al. ............. | 709/203 |
| 6,012,098 | A | 1/2000 | Bayeh et al. | |
| 6,098,093 | A | 8/2000 | Bayeh et al. | |
| 6,247,044 | B1 * | 6/2001 | Gosling et al. ............. | 709/203 |
| 6,912,588 | B1 * | 6/2005 | Jardin et al. ................ | 709/238 |

FOREIGN PATENT DOCUMENTS

WO   WO 99/66385 A   12/1999

\* cited by examiner

*Primary Examiner*—William Thomson
*Assistant Examiner*—Qing-Yuan Wu
(74) *Attorney, Agent, or Firm*—Marks & Clerk; S. Mark Budd

(57) ABSTRACT

Methods and components for processing Universal Resource Locator (URL) requests for web content are presented. The application servers and/or application software implement request switching components adapted to route URL requests for web content to servlets adapted to perform modularized functionality in servicing URL requests. The combination of request switch and servlet components define a request processing network. The advantages are derived from a flexibility in adding, modifying, and removing servlets from the request processing network at reduced regression testing. Each URL request is optimally routed only to necessary components to service the request. The use of request switches consolidates and simplifies the servlet triggering functionality in selecting servlets to service each URL request enabling specialized processing of URL requests. Solutions using servlet network arrangements enable parallel processing of URL requests.

14 Claims, 8 Drawing Sheets

FIG. 9

Switch: Service Main

| Rules | | | |
|---|---|---|---|
| Condition | | Action | |
| Request Object | Response Object | | |
| default | * | get welcome page | Direct Action |
| * | WebPage | exit | Direct Action |
| * | DocumentNotFound | get NotFound web page | Direct Action |
| PublicAccess.html | * | get public search engine web page | Direct Action |
| Search(SearchString) | | public access search engine | Servlet |
| *public.html | * | public access search engine | Switch |
| Register.html | | register customer welcome | Switch |
| CustomerID=* | * | register customer | Switch |
| RestrictedAccess.html | | validate user welcome | Switch |
| UserName=*&Password=* | UserInvalid | validate user | Servlet Pipeline |
| * | AuthenticateFail | register customer welcome | Switch |
| RestrictedAccess.html&UserName=* | | validate user welcome | Switch |
| RestrictedAccess.html&UserName=* | ValidCookie | get restricted search engine web page | Servlet Pipeline |
| * | InvalidCookie | validate user welcome | Direct Action |
| UserName=*&Search(SearchString) | | validate user | Switch |
| UserName=*&Search(SearchString) | ValidCookie | restricted access search engine | Servlet Pipeline |
| UserName=Anonymous&Search(SearchString) | * | public access search engine | Servlet |
| *restricted.html | | validate user welcome | Switch |
| *restricted.html&UserName=* | | validate user | Servlet Pipeline |
| *restricted.html&UserName=* | ValidCookie | check authorization | Servlet |
| *restricted.html&UserName=* | ValidCookie&Authorized | restricted access search engine | Servlet |
| *restricted.html&UserName=* | ValidCookie&UnAuthorized | get NoAccess web page | Direct Action |

Switch: Validate User Welcome — 1282

| Request Object | Rules | | |
|---|---|---|---|
| | Condition | | Action |
| | Response Object | | |
| * | | | determine SSL status |
| * | SSLexpired | | establish SSL |
| * | SSLactive | | get validate user welcome page |
| * | WebPage | | exit |

1284 → Servlet / Servlet / Direct Action / Direct Action

FIG. 10

Switch: Register Customer Welcome — 1082

| Request Object | Rules | | |
|---|---|---|---|
| | Condition | | Action |
| | Response Object | | |
| * | | | determine SSL status |
| * | SSLexpired | | establish SSL |
| * | SSLactive | | get register customer welcome page |
| * | WebPage | | exit |

1084 → Servlet / Servlet / Direct Action / Direct Action

FIG. 11

Switch: Register Customer — 1182

| Request Object | Rules | | |
|---|---|---|---|
| | Condition | | Action |
| | Response Object | | |
| CustomerID=* | | | determine if CustomerID valid |
| * | CustomerIDInvalid | | get WeAreSorry page |
| * | CustomerIDValid | | send UserName, get ThankYouForRegistering web page |
| * | WebPage | | exit |

1184 → Servlet / Direct Action / Servlet / Direct Action

REQUEST PROCESSING SWITCH

FIELD OF THE INVENTION

The present invention relates to software components for provisioning web-based services, more particularly to software components for efficiently servicing requests.

BACKGROUND OF THE INVENTION

One method of delivering web content to a web browser client application includes servicing URL requests issued by the web browser client application. Request specifications include the formatting of what are known in the art as Universal Resource Locator (URL) strings. A portion of a typical URL string represents a network address of the web server to which a corresponding URL request is directed.

For example, a web server may provide a keyword-based web-page search service. A web browser client sends a search request for web pages related to "blue skies" to the web server. An exemplary URL request string specification may have the following form:

URL="http://www.searchservice.org/findwebpages?+blue+sky"

where the "www.searchservice.org" portion represents the network address of the web server provisioning the keyword-based web-page search service, and the remaining portion of the URL string represents the search request.

Legacy web servers providing search services, having received the URL request, provide the search request portion of the URL string to web-page search software applications which parse the search request and respond appropriately. The performance characteristics of such a prior art implementation are closely related to the performance of such web-page search software application. In support of complex solution offerings, software application code provisioning services is modularized perhaps using JAVA™ applet technology to enhance performance in servicing a large number of requests.

Other exemplary prior art solutions include application servers running web-page search software applications. The performance characteristics of such an implementation therefore is closely related to the performance of the application server(s) used as well related to the performance of web-page search software applications executing thereon.

A prior art improvement to servicing the exemplary search request mentioned above is shown in FIG. 1. An application server 100 services the search request using JAVA™ servlets 122, 124, and 126 in response to the "findwebpages" directive. JAVA™ servlets 122, 124, and 126 are provisioned on Dynamo™ software by ATG, a commercially available application server product.

In accordance with the operation of the Dynamo™ software, the URL request 102 is received 132 by a request adapter 104. The request adapter 104 performs front-end processing on the received URL request 102. The request adapter 104 parses 134 the URL request 102 and generates 136 a request object 106 containing URL information for the search request 102 as well as host information corresponding to the communications network node associated with the web-browser client. A response object 108 is also generated.

The request 106 and response 108 objects are processed by the group of Java™ servlets 122, 124, and 126 sequentially. The sequential group of servlets 122, 124, and 126 is known in the art as a request processing pipeline 120. Depending on information contained at least in the request object 106, one or more of the servlets 122, 124, and 126 will perform an operation to service the exemplary search request and update at least the response object 108 before passing the request 106 and response 108 objects to the next servlet in the pipeline 120.

In accordance with the prior art exemplary implementation, the servlet 122 is a web-page search servlet which: extracts 142 the first search term "blue" from the request object 106, generates 144 web-page hits for the first search term, and updates 146 at least the response object 108. The (modified) request 106 and response 108 objects are passed along the servlet pipeline 120.

The servlet 124 is also a web-page search servlet which: extracts 152 the second search term "sky" from the (modified) request object 106, generates 154 web-page hits for the second search term, and updates 156 at least the response object 108. The (modified) request 106 and response 108 objects are passed along the servlet pipeline 120.

The servlet 126 is a list manipulation servlet which: extracts 162 the web-page hits from the modified response object 108, combines 164 the page hits and updates 166 at least the response object 108. The exemplary list manipulation extracts common web-page hits found by both of the servlets 122 and 124. The (modified) request 106 and response 108 objects are passed along and out of the servlet pipeline 120.

A response adapter 110 performing back-end processing of URL requests may be used to: extract 172 the combined hits from the modified response object 108 and generate a web page of hits 174. In generating 136 the response object 108, an HyperText Markup Language (HTML) template to be returned to the web-browser client may be included therein, in which case steps 172 and 174 merely process the HTML template into a web-page 112. Using host information specified in the request object 106, the information held in the serviced response object 108 is sent 176 to the web-browser client as an HTML page 112, in reply to the URL request 102.

Several problems are encountered in using the prior art solution. The request 106 and response 108 objects are passed through each and every servlet 122, 124, and 126 in the pipeline 120 regardless of whether or not a specific servlet (122, 124, and 126) is relevant to the processing of the URL request 102. Much processing time is wasted, if the request 106 and response 108 objects are passed through many servlets irrelevant to processing the corresponding URL request 102, contributing to an inefficient service offering. For example, if only one search term is specified in the search request, the servlet 122 is the only relevant servlet to that particular search request. Passing the request 106 and response 108 objects through the servlets 124 and 126 wastes time, uses request processing resources unnecessarily and is therefore inefficient.

Therefore services provisioned using servlet pipelines, typically utilize a limited number of servlets to balance processing time and resource utilization against the capabilities of the provisioned service. When applied to the exemplary prior art implementation, a limitation on the number of search terms, limiting the capabilities of the search service, therefore becomes necessary to provide reasonable search request processing response times for typical search requests.

Therefore the sequential passing of the request 106 and response 108 objects through the entire pipeline 120 regardless of whether each servlet in the pipeline 120 is relevant to the processing of the URL request 102 leads to unscalability in provisioning services using such an implementation.

Additionally, servlets 124 and 126 must be coded to recognize triggering conditions to cause them to perform their function. Including servlet triggering functionality into servlet code duplicates application code and introduces the risk of optional servlets 124 acting at an inappropriate time or in an inappropriate manner. Furthermore, servlet triggering greatly complicates specialized processing of a URL requests 102.

Other problems relate to modifying a servlet and/or adding a new servlet to a pipeline. Such changes to the pipeline introduces the risk of making the entire pipeline inoperable, since all of the request 106 and response 108 objects flow sequentially through all the servlets in the pipeline.

Yet another problem with using pipelined processing of URL requests comes from the fact that such URL request processing has an all-or-nothing result which greatly complicates the development and debugging of services provisioned using long sequences of servlets.

With the growing demand for web-based services, the ability to control the presentation of web-content to customers is critically important to efficient and effective service provisioning. There therefore is a need to solve the above mentioned problems to improve URL request processing.

SUMMARY OF THE INVENTION

In accordance with an aspect of the invention, a server participating in a communications network is provided. The server includes means for generating a request object and a response object for each request message received from a data network node in the communications network. A plurality of request processing modules are operable to examine at least one of the request object and the response object, and to modify at least the response object in servicing the request message. At least one switching component is operable to examine at least one of the request object and the response object in determining at least one of the plurality of request processing modules to which to forward the request and response objects. And, response transmission means for sending via the communications network to the data network node information derived at least from the modified response object. The arrangement defines a network of request processing modules for dynamic processing of request messages in parallel.

In accordance with another aspect of the invention, a method of processing a request message received by an application server from a node in a communications network is provided. The method includes a sequence of steps. A request object and a response object are generated for the received message. Information held in the request message received is encapsulated in the request object. Upon examination of at least one of the objects, a determination is made as to which one of a plurality of request processing modules to send the objects in order to further the servicing of the request message. And, the objects are provided to a means of response transmission for sending via the communications network to the data network node information derived at least from the modified response object.

In accordance with a further aspect of the invention, a facility for configuring a network of request processing modules comprised of at least one switching component and a plurality of request processing modules is provided.

In accordance with a further aspect of the invention, an access controller for electronic content delivery is provided. The access controller holds public access electronic content and restricted access electronic content. The access controller further includes a request processing network operable to receive request messages and serve electronic content based on information conveyed via the request message.

In accordance with yet another aspect of the invention, a method of using the access controller claimed to effect control over electronic content delivery is provided.

Advantages are derived from a flexibility in adding, modifying, and removing servlets from a servlet network while minimizing regression testing. Each URL request is optimally processed only by the servlets necessary to service the request. The use of request switches consolidates and simplifies the servlet triggering functionality in determining which servlets to service each URL request enabling specialized processing of URL requests. The use of the request switch allows a reduction in the complexity and resources required to provision web based service solutions. This reduction in the number of components involved in processing a request greatly improves overall reliability and flexibility in provisioning services. Solutions using servlet tree arrangements enable parallel processing of URL requests.

BRIEF DESCRIPTION OF THE DRAWINGS

The features and advantages of the invention will become more apparent from the following detailed description of the preferred embodiments with reference to the attached diagrams wherein:

FIG. 9 is a schematic diagram showing an exemplary group of rules used by a request processing switch in provisioning the exemplary service implemented using the servlet network arrangement presented in FIG. 8;

FIG. 10 is another schematic diagram showing another exemplary group of rules used by another request processing switch in provisioning the exemplary service implemented using the servlet network arrangement presented in FIG. 8;

FIG. 11 is a further schematic diagram showing a further exemplary group of rules used by a further request processing switch in provisioning the exemplary service implemented using the servlet network arrangement presented in FIG. 8; and FIG. 12 is yet another schematic diagram showing yet another exemplary group of rules used by yet another request processing switch in provisioning the exemplary service implemented using the servlet network arrangement presented in FIG. 8.

It will be noted that in the attached diagrams like features bear similar labels.

DETAILED DESCRIPTION OF THE EMBODIMENTS

The present invention provides additional functionality over the prior art in an attempt to improve URL request processing.

Figure 1:
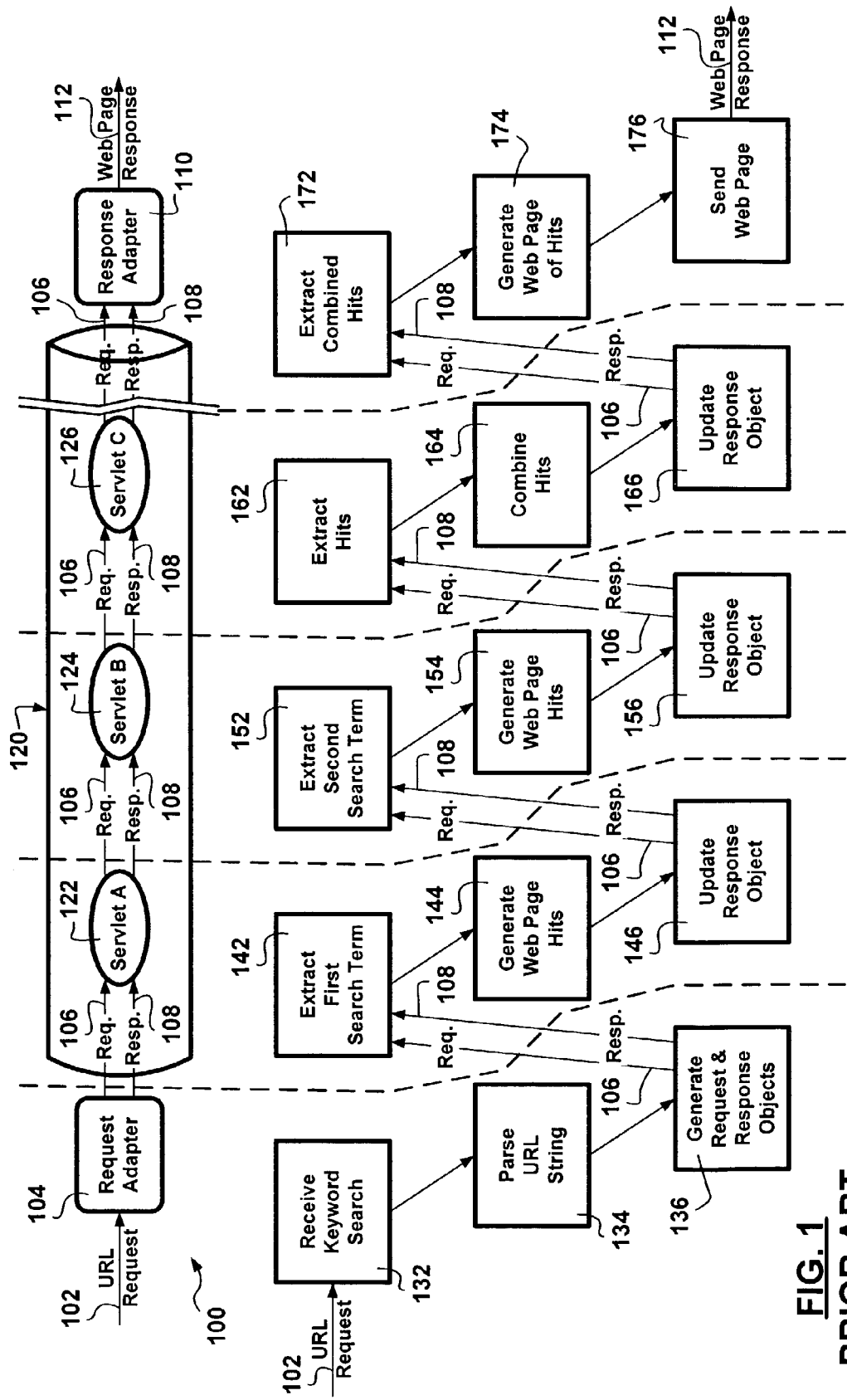
FIG. 1 is a schematic diagram showing elements and process steps processing URL requests in accordance with a prior art implementation of an exemplary service.
Figure 2:
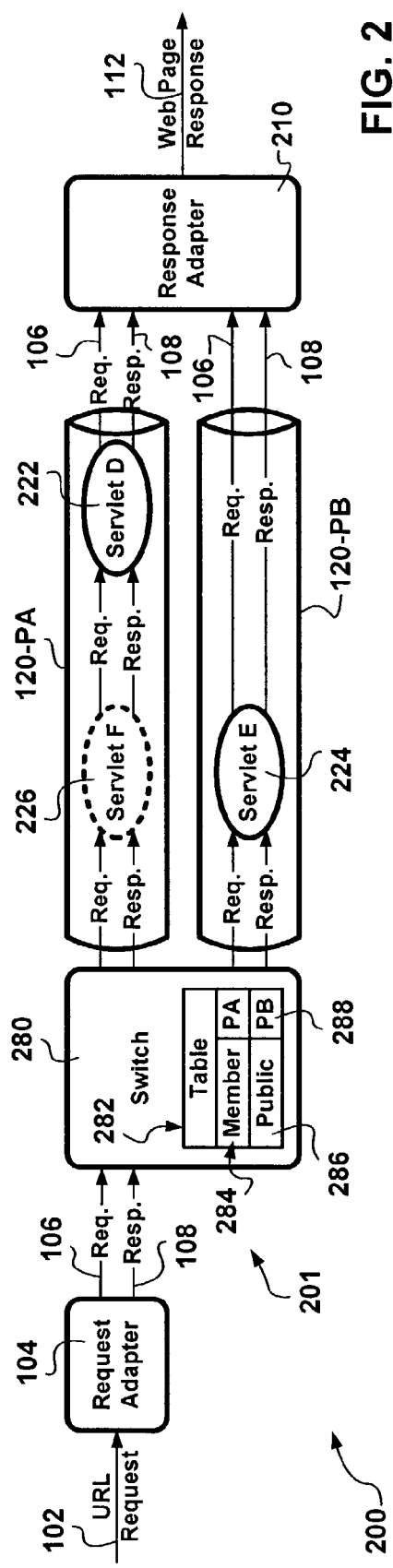
FIG. 2 is a schematic diagram showing components of a service provisioning solution in accordance with an exemplary embodiment of the invention.

In accordance with an exemplary embodiment of the invention generically shown in FIG. 2, a new entity, referred to herein as a request processing switch 280, is provided to allow for real-time dynamic routing of the request 106 and response 108 objects corresponding to each URL request 102 in a servlet network 201. URL request processing may be specified via a group of rules. Therefore the rules determine how an individual URL request 102 is switched through the servlet network. The dynamic routing of request 106 and response 108 objects within the servlet network 201 is sensitive to information held at least in the request object 106.

A facility is provided for registering servlets with a servlet network (201) as well a facility is provided for creating request switch instances and configuring corresponding switching tables codifying URL request processing rules. Servlet network configurations may be persistently stored. Methods of specifying and storing URL processing rules and servlet network configurations include but are not limited to the use of extensible Markup Language (XML) based files.

An improved utilization of application server resources is achieved via the ability to handle a variety of URL requests 102.

In accordance with the preferred embodiment of the invention, triggering information previously specified in servlet component code is consolidated and handled only by the request processing switches 280. For this purpose, a switching table 282 includes entries 284 holding URL processing rules, each entry 284 specifying conditions 286 based on which actions 288 are to be taken in processing of a particular URL request 102. Actions 288 include switching the processing of the URL request 102 to a specified processing flow.

The request switch 280, shown in FIG. 2, is associated with an ingress into the servlet network 201 implemented on application server 200. For example, the servlet network 201 brokers electronic web-browsing based access to a subscription based service. Servlet 222 brokers access to a member services while servlet 224 brokers access to public information about the service.

For each URL request 102 received, the request switch 280 determines, dependent on information contained at least in the request object 106, to which servlet 222 or 224 the request 106 and response 108 objects should be sent for processing. The request switch 280 may use the user information found in the URL request 102 and therefore also in the request object 106 to differentiate between URL requests 102 issued by member users or anonymous public users.

The use of the request switch 280 enables independent development, modification, customization, activation, deactivation, etc. of each one of the servlets 222 and 224. Although the servlet network 201 provisioning the exemplary subscription based access is implemented using two servlets 222 and 224, each URL request 102 is optimally processed by a single servlet. The servlet 222 is in a different URL request processing flow than the servlet 224. The servlets in each of the servlet pipeline flows 120 are chosen to include only servlets relevant to particular URL requests 102 processed while excluding servlets irrelevant to those URL requests 102, thereby improving the efficiency with which the request 106 and response 108 objects are processed. In this case, the request 106 and response 108 objects directed to the servlet 222, are processed by the servlet 222 only. The time otherwise taken by the URL request 102 to pass through servlet 224 is saved.

Changes may be made to the servlet 222 without introducing a risk of affecting the processing of URL requests 102 through servlet 224. Furthermore, additional servlets may be added to a processing flow without affecting other processing flows.

In accordance with an exemplary scenario, a user authentication servlet 226 may be added to identify service subscribers. This level of scrutiny is not required for public access to the service. The use of the request switch 280 limits the impact of incurred additional processing overhead in providing user authentication as the servlet 226 does not affect the processing of URL requests 102 for public access. Therefore regression testing in implementing user authentication will be performed only for member access only.

This means that the changes to a processing flow can be brought into service more quickly, since less regression testing is required because of the reduced risk to other URL request processing flows.

It will be noted that in accordance with the exemplary implementation presented in FIG. 2, in directing URL requests 102 for member or public access to services, the corresponding request 106 and response 108 objects are passed unidirectionally. Serially and sequentially linking of servlets in a URL request processing flow define a pipeline such as 120-PA. Unidirectional processing of URL requests 102 in the modified servlet pipeline 120-PA makes use of coded knowledge of the servlet 222 into the added servlet 226. The correct coding of knowledge of servlet 222 into the added servlet 226 is to be tested. Therefore, the request switch 280 may also be understood as switching URL request processing onto specialized pipelines 120-PA or 120-PB. In this sense the request switch 280 may also be referred to as a pipeline switch.

Furthermore, in accordance with the an embodiment of the invention, a new URL request processing flow (servlet pipeline) can be added to the servlet network 201 without introducing a risk to existing URL request processing flows. Regression testing would only need be performed on the newly added URL processing flow. For this reason, all URL request processing flows may be regarded as parallel servlet pipelines.

URL requests 102 may therefore be processed in parallel reducing response times in support of scalable service provisioning implementations.

The invention is not limited to unidirectional URL processing flows between components. Solutions need not necessarily divide the service provisioning into pipelined processing of requests.

Figure 3:
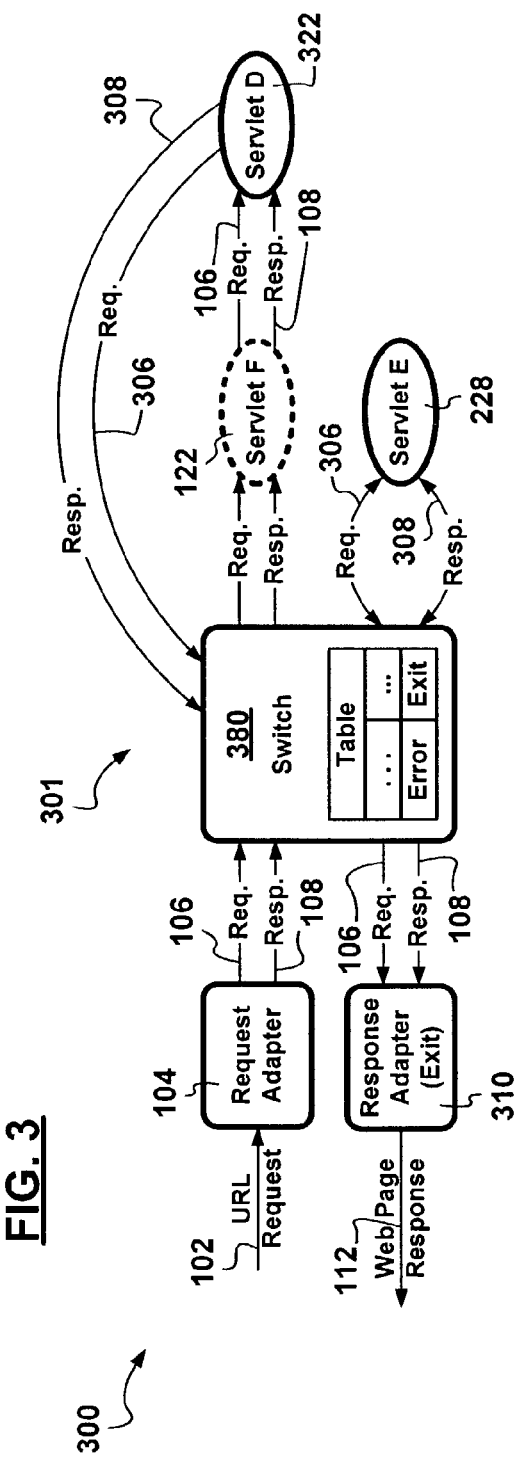
FIG. 3 is another schematic diagram showing components of a generic service provisioning solution in accordance with another exemplary embodiment of the invention.

FIG. 3 shows non-unidirectional processing of URL requests 102 by an application server 300 making use of a servlet network 301 in which a servlet 322 is not coded with knowledge of the next servlet used in processing URL requests 102. The servlet 322 is coded to return request 306 and response 308 objects to request processing switch 380 on completion of the associated URL processing task. Information regarding which request processing switch 380 to return the request 306 and response 308 objects to may be specified or be the result of default behavior of the servlet 322. Adding servlet 122 to the flow does not affect the return functionality of the servlet 322.

Request 306 and response 308 object return functionality provides support for implementing the extraction of a measure of success in processing a URL request 102. Upon failure the measure of success may be specified at least in the response object 308 and the request switch 380 may be coded to detect and respond appropriately to URL request processing failures. Such functionality provides support for regression testing and debugging of new/modified solutions.

Also shown in FIG. 3, is a response adapter 310 attached to the request switch 380. This further removes the necessity to code servlets with knowledge of the response adapter 310.

Figure 4:
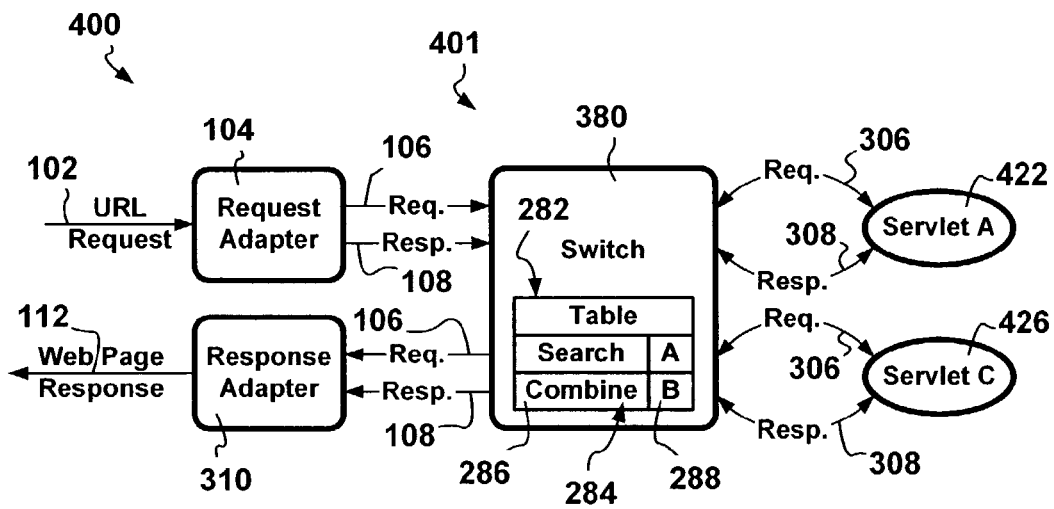
FIG. 4 is schematic diagram showing an implementation of the exemplary service presented in FIG. 1 in accordance with the invention.

FIG. 4 shows the exemplary web-page search service described above implemented in accordance with an exemplary embodiment of the invention, using the servlet network 401 on application server 400. Only one servlet 422 is used to search for web-pages corresponding to each search term while servlet 426 is used to combine web-page hits. The request switch 380 dynamically routes the processing of a search request to the servlet 422 for as may times as necessary corresponding to each search term. It will be noted that any number of search terms may be submitted in a URL request 102. A reduction on processing resource utilization is achieved over the prior art solution as servicing each search request only uses the necessary processing resources from the application server 400.

Figure 5:
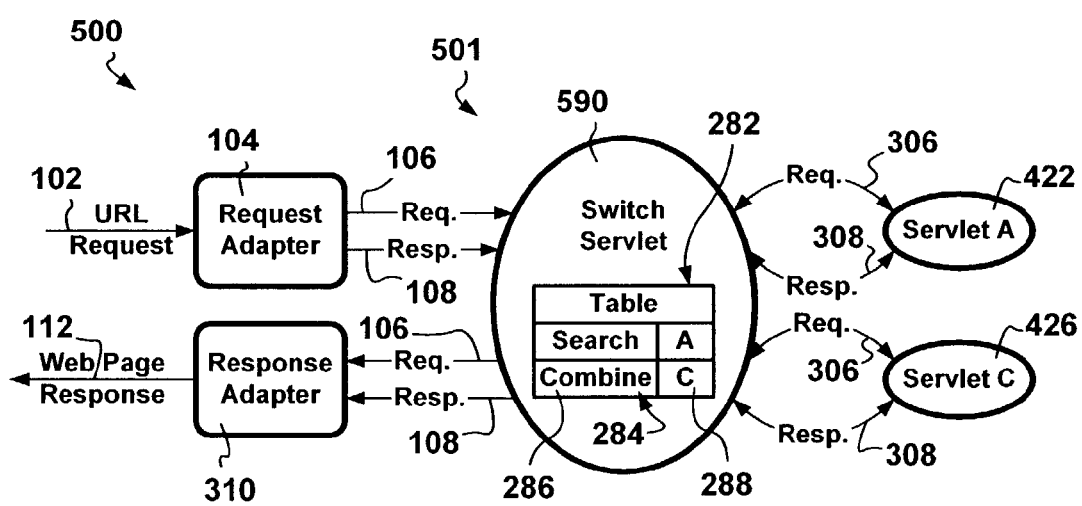
FIG. 5 is another schematic diagram showing a variation of the implementation of the exemplary service presented in FIG. 1 in accordance with the invention.

FIG. 5 shows the exemplary web page search service described above re-implemented using the servlet network 501 on application server 500. It is to be noted that the request switch 590 may itself be a JAVA™ servlet 590. In this case the switch servlet 590 is further adapted to perform side actions besides being adapted to direct processing of URL requests 102 to servlets 522 and 526 respectively.

Although in the figures presented above, request switches 280, 380, and 590 are shown to be associated with edges of the servlet networks #01, the invention is not limited thereto, the request switching components can also be placed at any point within a servlet network to define more granular URL request processing. This provides the guarantee that only logic required to service a particular URL request would utilize URL request processing resources and computation time of the associated application server.

Figure 6:
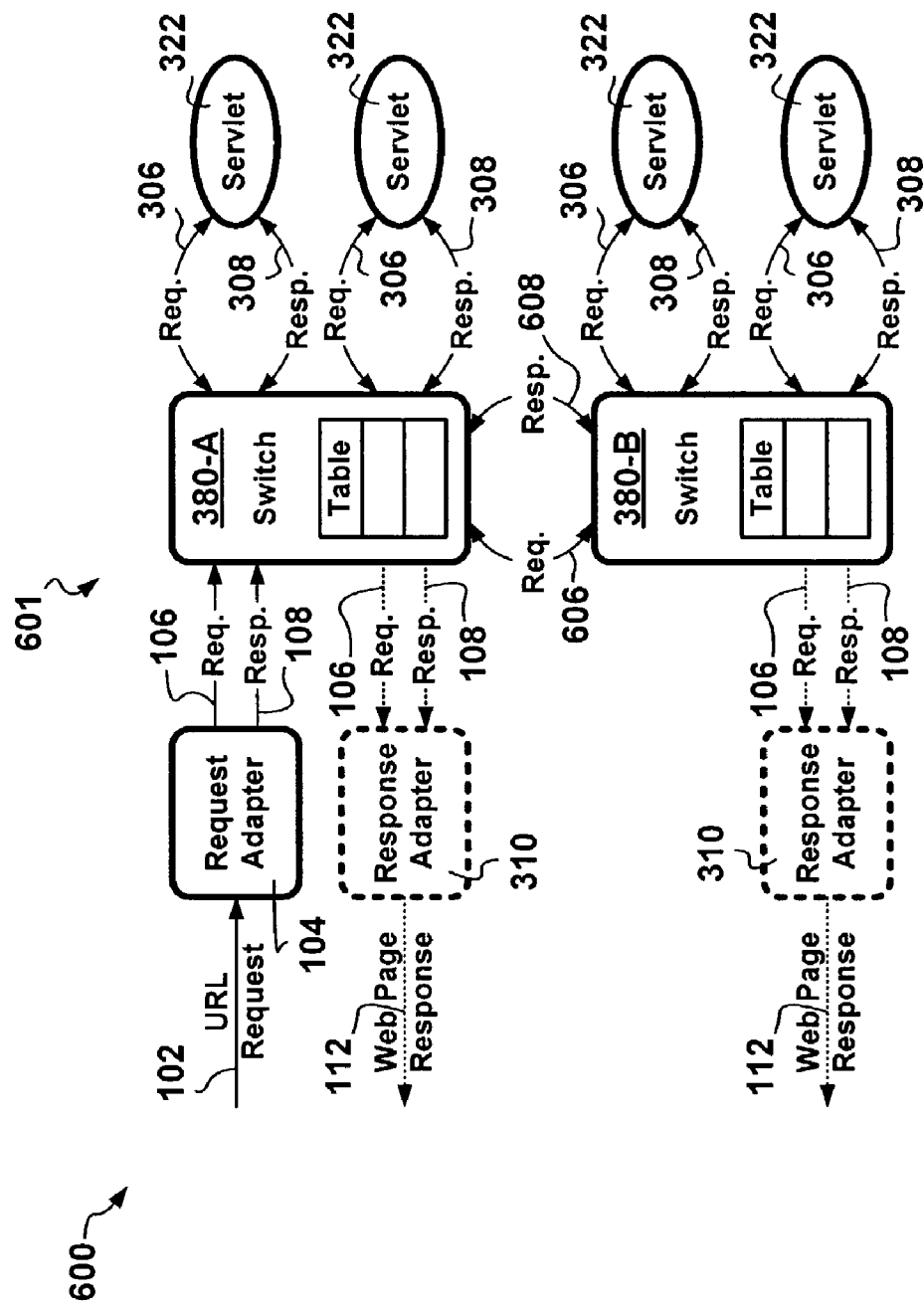
FIG. 6 is a schematic diagram showing an exemplary implementation of a generic service using an exemplary servlet network arrangement of components in accordance with an exemplary embodiment of the invention.
Figure 7:
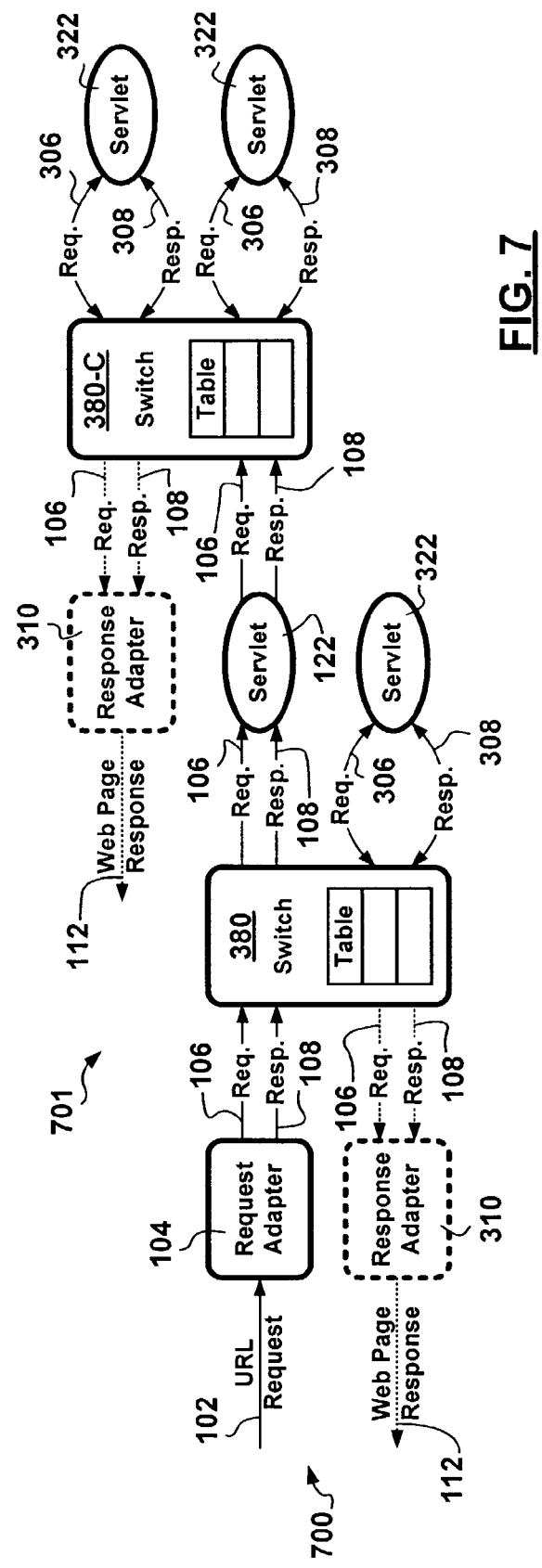
FIG. 7 is another schematic diagram showing another exemplary implementation of a generic service using another exemplary servlet network arrangement of components in accordance with another exemplary embodiment of the invention.

Additional switches 280/380 may be added to create arbitrarily complex servlet networks 600/700 as shown in FIG. 6 and FIG. 7. In particular FIG. 6 shows a request switch 380-B attached to another request switch 380-A exchanging request 606 and response 608 objects therebetween, while FIG. 7 shows a request switch 380-C attached to a servlet 122. It is to be noted that the response adapter 310 need not necessarily be attached to the same request switch 280 to which the request adapter 104 is attached to.

Figure 8:
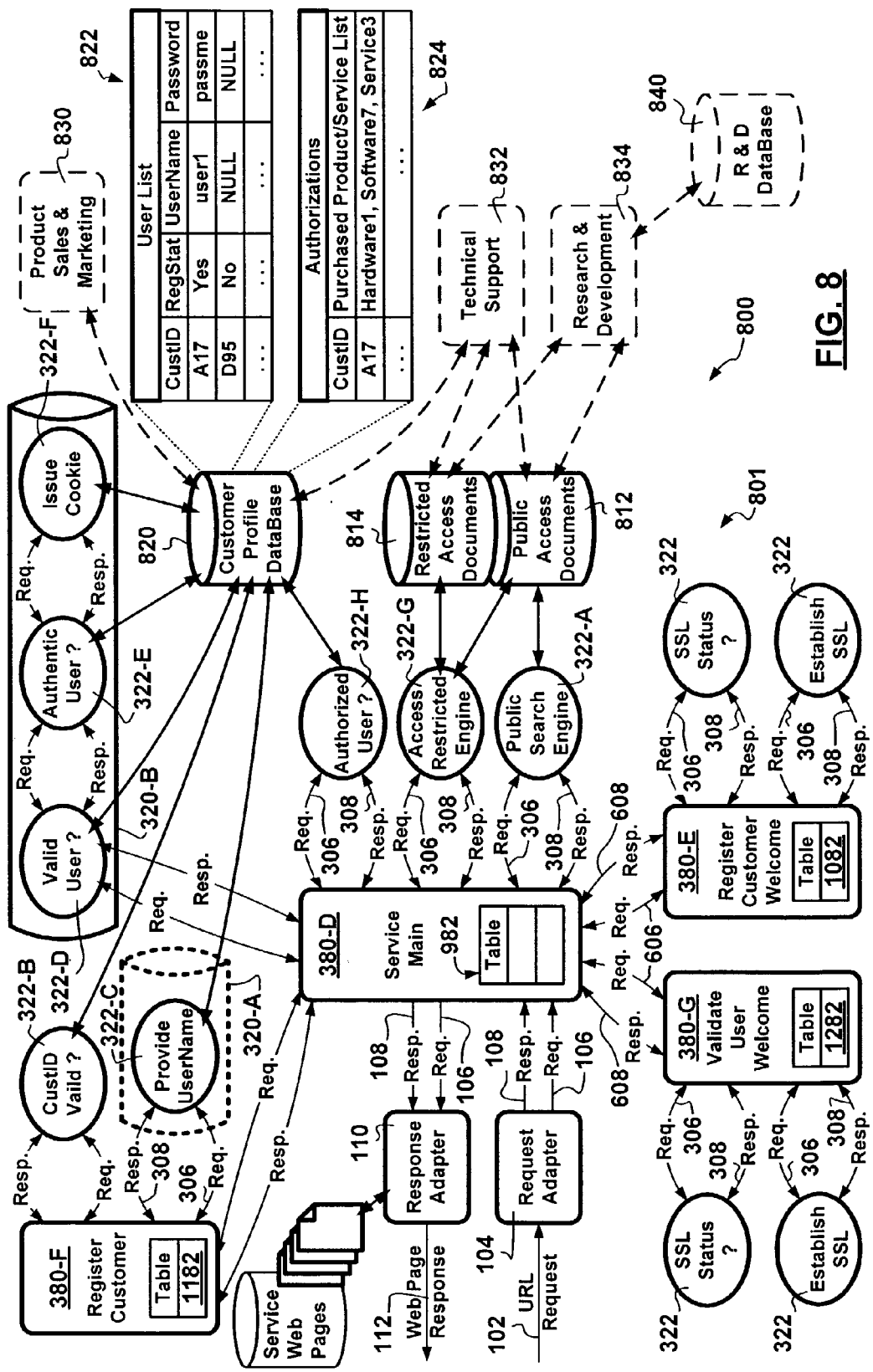
FIG. 8 is another schematic diagram showing another exemplary service provisioned using another exemplary servlet network arrangement of components in accordance with another exemplary embodiment of the invention.

FIG. 8 is another schematic diagram showing a web-enabled technical support service provisioned using an exemplary servlet network 801 in accordance with another exemplary embodiment of the invention.

In accordance with the web-enabled technical support service implemented on application server 800, a request processing switch 380-D brokers electronic web-browsing based access to technical documentation related to vendor specific products.

Multiple entities are to have access to the technical documentation. Members of the general public require access to product overview/feature type of technical documentation to enable the members of the general public to make a decision whether to purchase the vendor specific products and services. The vendor's sales and marketing department 830 requires access to product feature/benefits type of technical documentation to enable the sales and marketing team to provide the members of the general public with answers to questions in entertaining a product/service sales agreement. The vendor's technical support team 832 and product/service customers require access to installation/configuration/troubleshooting type of technical documentation in helping new customers with the product/service purchased. And, but not least, the vendor's research and development team 834 requires access to all technical documentation to update and augment thereof.

The technical documentation therefore is divided between: closely held technical documentation held typically in a research and development database 840 and released technical documentation accessible via the application server 800. A portion 812 of the released technical documentation is designated for public access by members of the general public and another portion 814 of the released technical documentation is designated for restricted access by customers and vendor staff only. The division between users of the technical documentation available is enabled via a user list 822 held in a customer profile database 820. The sales and marketing team 830 is provided with an ability to add users to the user list 822 by issuing customer identifiers (CustomerIDs) to new customers in the process of finalizing sales contracts. The customer profile database 820 may also keep track 824 of the products and services selection purchased by each customer. Keeping track of the products and services selection purchased by each customer provides support for implementing authorized access to the restricted technical documentation such that customers only have access to technical documentation regarding purchased products and services only.

Customers and members of the general public interact with the technical document provisioning solution, in a web-browsing session, by sending URL requests 102 to the application server 800. Each URL request 102 is intercepted by the request adapter 104 which generates corresponding request 106 and response 108 objects. Initially the request object 106 contains particulars of the original URL request 102. The response object may hold the customer's network address to return web pages thereto.

FIG. 9 is a schematic diagram showing an exemplary group of rules 982 used by the request processing switch 380-D in provisioning the exemplary service implemented using the servlet network arrangement 801 presented in FIG. 8.

The request object 106 corresponding to a generic URL request 102 "http://www.vendor.com/" is typically empty. This condition corresponds to the first rule 984 which instructs the application server 800 to fulfill the generic URL request 102 by serving the vendor welcome page. The response object 108 is populated with a corresponding welcome page specification such as, but not limited to, a file name. An exemplary implementation paradigm may be defined to have the ultimate goal of serving a web page for each reserved URL request 102. Should a condition occur in which no web page can be served, the response object 108 is populated with a message, typically "DocumentNotFound" and the request switch 380-D (perhaps via the response adapter 110) provides a corresponding service error web page. The response object 108 being populated with a web page fulfills the second rule 984 in table 982 which specifies that at least the response object 108 is to be provided to the response adapter 110. The response adapter 110 performs back-end processing which may include the actual retrieval of service web pages. Service web pages include corporate content web pages.

All other URL requests 102 are decomposed and typical corresponding service related request object contents are shown in subsequent entries 984 of the table 982.

The request object 106 may specify a service web page to be served such "PublicAccess.html". The corresponding rule calls for, a public search engine web page to be served. In interacting with the public search engine web page, a subsequent URL request 102 is received by the application server 800 specifying a search request. The request object 106 corresponding to the URL request 102 may contain only the search request. By default, processing of search requests is directed to a public access search engine servlet 332-A which has access to the public access documents 812. The public access search engine servlet 322-A will respond with a web page of search hits. A subsequent URL request 102 would request at least one public web page. Any "*public.html" requests for a public web page are directed to the public access search engine servlet 322-A to retrieve and serve thereof.

The request object 106 may also specify the "Register.html" service web page to be served to a new customer. The processing of the corresponding URL request 102 is directed to a request processing switch 380-E welcoming new customers.

FIG. 10 is another schematic diagram showing another exemplary group of rules 1082 used by the request processing switch 380-E in provisioning the exemplary service implemented using the servlet network arrangement presented in FIG. 8.

Various rules 1084 establish/re-establish secure communications with the customer's web browser and serve a register customer welcome web page. A subsequent URL request 102 is generated by interacting with the register customer welcome page. The corresponding request object 106 contains new customer provided data including a CustomerID. The request switch 380-D recognizes that fact and provides the request object 106 to another switch 380-F to effect the registration of the new customer.

FIG. 11 is a further schematic diagram showing a further exemplary group of rules 1182 used by the request processing switch 380-F in provisioning the exemplary service implemented using the servlet network arrangement presented in FIG. 8.

Rules 1184 redirect the processing of the URL request 102 to servlet 322-B which consults the customer profile database 820 and in particular the user list 822 to determine if an entry corresponding to the CustomerID exists. The results are specified in the corresponding response object 108. If the CustomerID is invalid, an apologetic web page is served to the potentially new customer. If however the CustomerID is valid, the processing of the URL request 102 is directed to servlet 322-C or potentially to a servlet pipeline 320-A wherein the customer is provided with a UserName, the customer provides a password, the customer profile database 820 is updated, the user is served a confirmation web page, etc. The servlet pipeline 320-A may include as many servlets as necessary to effect new customer registration. The request processing switch 380-F may have a more specialized servlet network chained thereto dependent on the complexity of the registration process. For example, the new user may have to accept license agreements, terms of use agreements, etc.

The request object 106 may also specify the "RestrictedAccess.html" service web page to be served. Regardless of the contents of the response object 108, the processing of the corresponding URL request 102 is directed to a request processing switch 380-G to welcome registered users.

FIG. 12 is yet another schematic diagram showing yet another exemplary group of rules 1282 used by the request processing switch 380-G in provisioning the exemplary service implemented using the servlet network arrangement presented in FIG. 8. Various rules 1284 establish/re-establish a secure communication with the user's web browser and serve a validate user welcome page.

A subsequent URL request 102 is generated by interacting with the validate user welcome page. The user typically provides a username and password. An exemplary pipelined (320-B) approach to establishing a web browsing session for restricted access technical documentation is provided. The request object 106 bearing a username and password is provided to servlet 322-D which performs user validation. In validating a user, servlet 322-D consults the user list 822 using the user name as a search key.

If the username does not match with a username stored in user list 822, the corresponding response object 108 is populated with a "UserInvalid" message. The request processing switch 380-D, regardless of the contents of the corresponding request object 106, directs the URL request processing to request processing switch 380-E inviting the user to register with the service.

If the username matches an entry in the user list 822, the user is authenticated by servlet 322-E of the servlet pipeline 320-B. The authentication may include password verification by comparing the provided password with the password stored in the user list 822.

Should the authentication fail, the request processing switch 380-D, regardless of the contents of the corresponding request object 106, directs the URL request processing to request processing switch 380-G for username and password reentry.

A web browsing session is established subsequent to authentication. URL request processing is stateless. In accordance with the exemplary technical documentation service provisioning, session state information tracking may be provided via cookies. The issuance (322-F) and validation of cookies enables the implementation of session timeouts. The processing of any URL request 102 is directed to the request processing switch 380-G if the cookie is invalid or has expired.

Having established a web browsing session, a restricted access search engine web page is served in processing the request object 106 bearing "RestrictedAccess.html&UserName=*" and the response object 108 bearing "ValidCookie". Subsequent URL requests 102 bearing search strings are directed for processing either to the restricted access search engine servlet 322-G or back to the servlet pipeline 320-B if the cookie has timed out. An "Anonymous" username is customarily reserved, and requests objects 108 bearing thereof are directed to the public access search engine servlet 322-A. Search results are returned typically in the form of a web page of search hits.

In interacting with the search hits web page, a subsequent URL request 102 requests restricted access technical documentation. The corresponding request object 106 specifies thereof typically as a "*restricted.html" file. Various rules 984 apply to such request objects 106 which validate the user, authenticate the user, validates the cookie, etc. in a secure session. In particular attention is drawn to the case in which the user and session cookie are validated and the user is authenticated. In order for the user to actually retrieve a particular "*restricted.html" document, the URL request processing is directed to servlet 322-H which ensures that the user is authorized to receive the requested document—enforcing restricted access only to documents pertaining to products/services purchased by the customer. The servlet 322-H accesses the customer profile database and in particular the user authorizations tracking list 824. If the user is authorized to access the requested document, then the restricted access search engine servlet 322-G will serve thereof. Please note that a valid, authenticate and authorized user can access public technical documentation via the restricted access search engine (servlet 322-G).

The use of the request processing network 801 enables independent development, modification, customization, activation, deactivation, etc. of each one of the servlets 322-A through 322-H. Although the servlet network 801 provisioning the exemplary access to technical documentation is implemented using two servlets 322-A and 322-G, each URL request 102 is optimally processed. It is noted that in the exemplary implementation only one relevant servlet (322-A) and a small number of rules 984 are used to provide access to public technical documentation 812, while a specialized request processing subnetwork (servlets 322-B through 322-H and request processing switches 380-E through 380-G) is used to serve restricted access technical documentation 814. This level of scrutiny is not required for public access to technical documentation.

Although in the exemplary implementation restricted access to technical documentation was enforced via user validation, user authentication and user authorization, the invention is not limited thereto. An exemplary additional restricted access enforcement may also make use of rules 984/1084/1184/1284 which inspect the network address associated with the user's web browser to restrict access to technical documentation from specific network addresses, network address ranges, and/or domains.

Changes may be made to the various servlets 322 without introducing a risk of affecting the processing of URL requests 102 through the other servlets 322. Furthermore, additional servlets may be added to a processing flow without affecting other processing flows.

The efficiency with which the request 106 and response 108 objects are processed is optimized. The use of the request processing network 801 limits the impact of incurred additional processing overhead in providing user verification, authentication and authorization to restricted access to technical documentation. Therefore regression testing in implementing user validation, authentication and authorization will be performed only for implementing restricted access to technical documentation. Changes to a processing flow can be brought into service more quickly, since less regression testing is required because of the reduced risk to other URL request processing flows.

Relevant concepts of the invention were presented with respect to processing of HyperText Transport Protocol (HTTP) requests. Persons of ordinary skill in the art would understand that the HTTP protocol is just an example of protocols used in provisioning web based services. The concepts presented herein can be extended to other protocols used in provisioning web-based services such as: the File Transfer Protocol (FTP), Gopher, Telnet, etc.

Implementation of exemplary embodiments of the invention included the use of JAVA™ servlets, persons of ordinary skill in the art would understand that JAVA™ servlets are a subset of request processing components in a modularized provisioning of electronic services without limiting the invention thereto.

The use of the request processing switch provides a reduction in the complexity and resources required to provision web-based service solutions. This reduction in the number of components involved in processing a request greatly improves overall reliability and flexibility of such solutions.

The embodiments presented are exemplary only and persons skilled in the art would appreciate that variations to the above described embodiments may be made without departing from the spirit of the invention. The scope of the invention is solely defined by the appended claims.

We claim:

1. A server participating in a communications network, the server comprising:

means for generating a request object and a response object for each request message received from a data network node in the communications network;

a plurality of request processing modules, each processing module being operable to examine at least one of the request object and the response object, and to modify at least the response object in servicing the request message;

at least one switching module adapted to receive the request object and the response object from one of: the means for generating the request object and the response object; and a first processing module of the request processing modules, said at least one switching module being operable to examine at least one of the request object and the response object to determine a second request processing module of the plurality of request processing modules to which to forward the request and response objects; and response transmission means for sending via the communications network to the data network node information derived at least from the modified response object wherein said means for generating the request object and the response object, said plurality of request processing modules, said at least one switching module, and said response transmission means defines a network of request processing modules for dynamic processing of request messages in parallel.

2. The server claimed in claim 1, wherein the at least one switching module further comprises a switching table to determine which of the plurality of request processing modules is said second request processing module to which said objects will be switched to.

3. The server claimed in claim 1, wherein a group from the plurality of request processing modules define a request processing pipeline.

4. The server claimed in claim 3, wherein the at least one switching module is operable to examine at least one of the request object and the response object to determine to forward said objects to one of the second request processing module, the request processing pipeline, another switching module, and the response transmission means.

5. The server claimed in claim 1, wherein each request processing module, upon servicing said request message, is operable to forward said objects to one of a third request processing module, a second switching module, and the response transmission means.

6. The server claimed in claim 1, wherein a one of the plurality of request processing modules comprises a JAVA™ programming module.

7. The server claimed in claim 1, wherein the at least one switching module comprises a JAVA™ programming module.

8. The server claimed in claim 1, wherein the request object comprises Universal Resource Locator (URL) information associated with a URL specification specified in the request message.

9. The server claimed in claim 8, wherein the request object further comprises a network address of the data network node.

10. The server claimed in claim 1, wherein the information corresponding to the modified response object is a hypertext markup language (HTML) file.

11. A method of processing a request message received by an application server from a node in a communications network, the method comprising steps of:
   generating a request object and a response object for the received message;
   encapsulating in the request object information held in the request message received;
   forwarding the request object and the response object to a switching module;
   receiving at the switching module the request object and the response object;
   examining at the switching module at least one of said request object and said response object, to determine a first request processing module of a plurality of request processing modules to send said objects in order to further the servicing of the request message;
   forwarding said request object and said response object from said switching module to said first request processing module;
   at said first request processing module, modifying the response object; and
   providing said objects to a response transmission means for sending via the communications network to the data network node information derived at least from the modified response object.

12. A method for processing a request message as claimed in claim 11, wherein the method further comprises a step of duplicating said objects in servicing the request message.

13. A method for processing a request message as claimed in claim 11, wherein a plurality of request messages are processed in parallel.

14. A facility for configuring a network of request processing modules, said network of request processing modules comprised of:
   means for generating a request object and a response object for each request message received from a data network node in a communications network;
   a plurality of request processing modules, each processing module being operable to examine at least one of the request object and the response object, and to modify at least the response object to service said each request message;
   at least one switching module adapted to receive the request object and the response object from one of: the means for generating the request object and the response object; and a first processing module of the request processing modules, said at least one switching module being operable to examine at least one of the request object and the response object to determine a second request processing module of the plurality of request processing modules to which to forward the request and response objects; and
   response transmission means for sending via the communications network to the data network node information derived at least from the modified response object,
wherein said facility is operable to create a second switching module, and operable to define conditions for switching processing of said request message to one of the at least one switching module, the second request processing module, and the response transmission means.

* * * * *